Oct. 24, 1967   E. W. WATERS ETAL   3,348,414
GAS TURBINE TEMPERATURE MEASURING APPARATUS
Filed Oct. 9, 1964   2 Sheets-Sheet 1
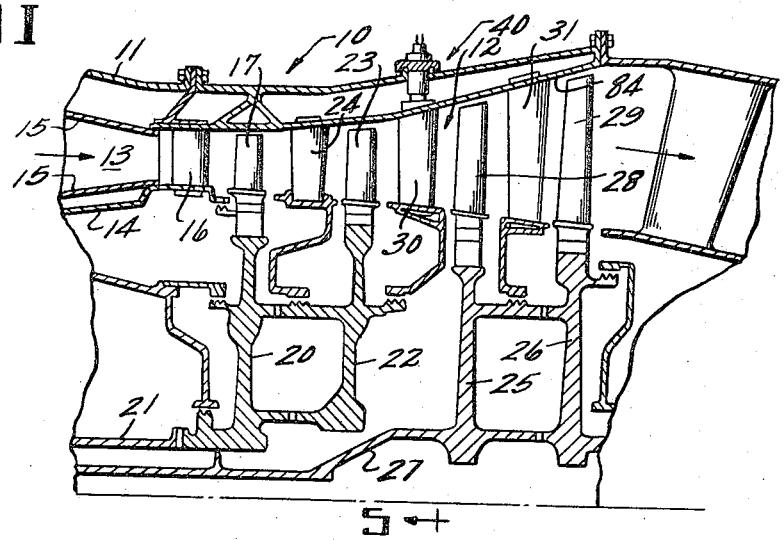
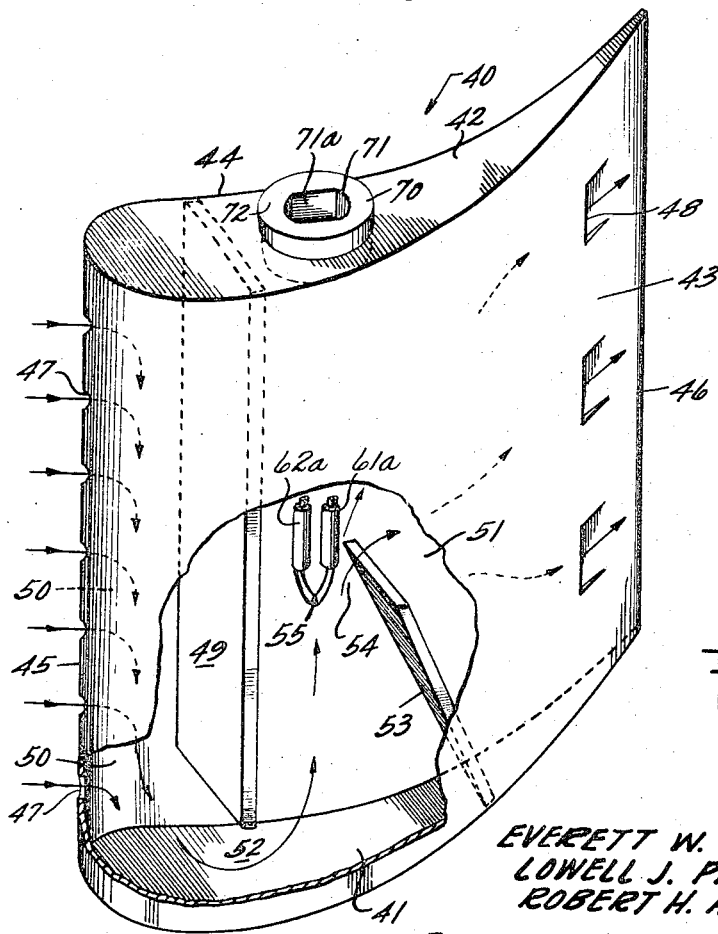
INVENTORS.
EVERETT W. WATERS
LOWELL J. PIERCE
ROBERT H. HUFNAGEL
By George R. Powers
ATTORNEY

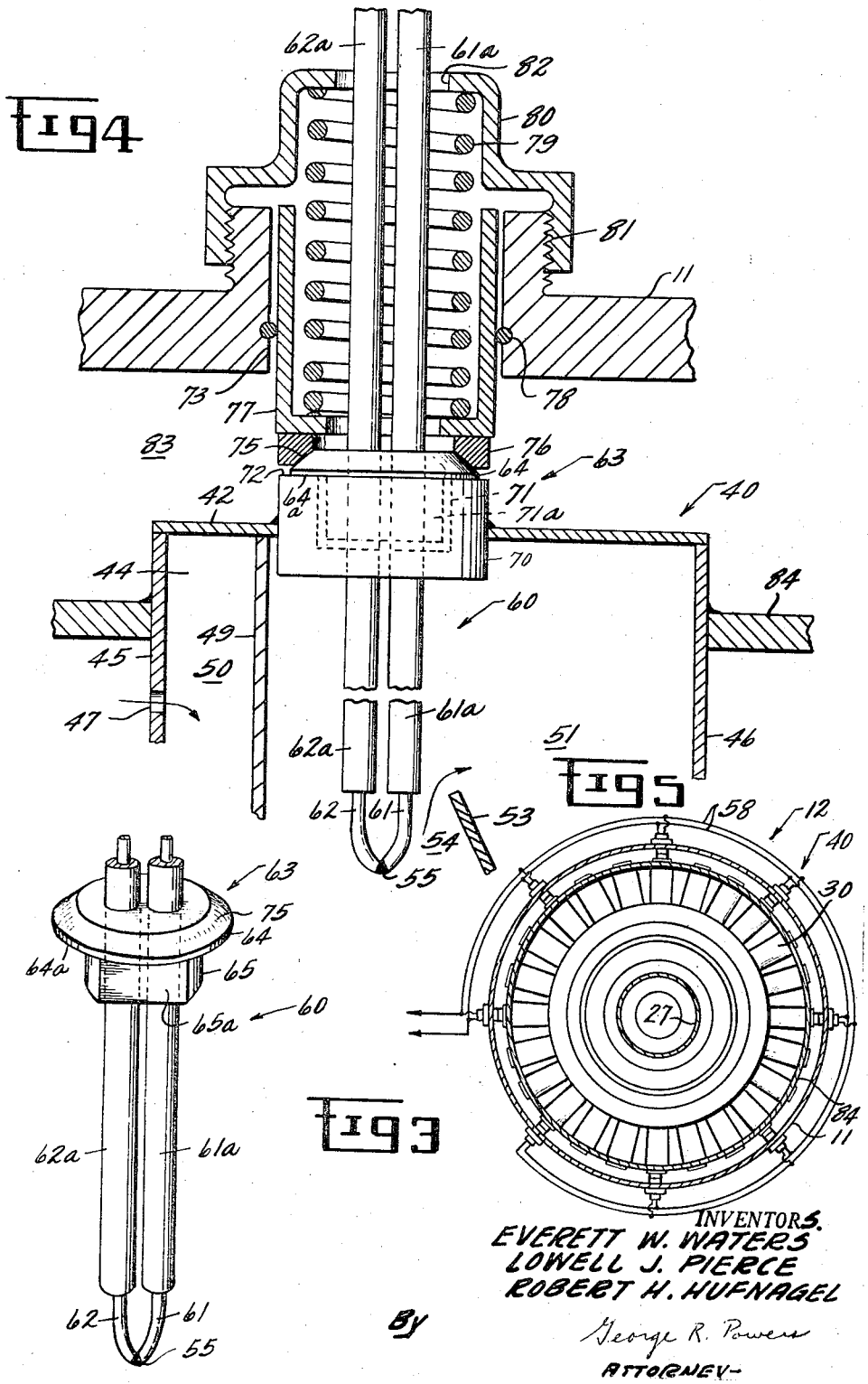

United States Patent Office

3,348,414
Patented Oct. 24, 1967

3,348,414
GAS TURBINE TEMPERATURE MEASURING APPARATUS
Everett Wilber Waters, Lynnfield, Robert Hughes Hufnagel, Marblehead, and Lowell Jackson Pierce, Melrose, Mass., assignors to General Electric Company, a corporation of New York
Filed Oct. 9, 1964, Ser. No. 402,877
5 Claims. (Cl. 73—341)

This invention relates to gas temperature measuring apparatus and, more particularly, to improved temperature measuring apparatus utilizing thermocouples for indicating the actual temperature of hot combustion gases in a gas turbine engine.

It is well known that the power output of a gas turbine engine may be increased by increasing the operating temperature of the turbine. This is particularly true in the case of turboshaft or turboprop engines where very small changes in the operating temperature can substantially affect the output. For example, it has been found in a typical engine of this type that a single degree Fahrenheit change in the temperature of the gases driving the power turbine can change the engine power output by as much as seven or eight horsepower. The maximum allowable operating temperature of the turbine, and consequently the maximum level of power output, is limited by the high temperature capabilities of the various turbine elements, particularly the airfoil shaped vanes and buckets upon which the high temperature combustion gases impinge. Therefore, to attain high output from a relatively light weight and compact powerplant, it is desirable to operate the turbine at temperatures as close to the maximum allowable temperature as practicable. In order to accomplish this without exceeding the high temperature capabilities of the turbine elements, the actual gas temperature must be determined in some manner and used as a limiting control parameter. It is conventional to measure the temperature of the gases in either the exhaust section of a turbojet engine or between the gas generator turbine and power turbine sections of turboprop and turboshaft engines. The measured temperature is then used as an indication of the higher temperatures actually existing in the upstream gas generator turbine and combustor sections of the engine, these upstream temperatures being too high for direct measurement by conventional sensing elements which are typically a plurality of thermocouples circumferentially spaced in the annular gas passageway and electrically connected so as to provide an electrical measurement of the average temperature.

It will be appreciated by those skilled in the art that certain measurement errors are inherent in the type of temperature measuring apparatus just described. For example, the average temperature of the total annular stream of combustion gases at a particular axial location in the engine may differ substantially from the local temperatures existing at selected circumferentially and radially spaced points having the same axial location. In other words, the temperature distribution of the stream of combustion products is not uniform. Because of various factors, particularly the high rate of heat transfer, it has been found that it is the average temperature, not the local temperatures, that is the significant control parameter. The locations selected for the thermocouples can thus have a significant effect on the temperature measured and used as an indication of the actual temperature. If the variation between the temperature measured and the actual temperature is large, some engines will run relatively cool, and thereby lack performance, while other engines will run hot, and thereby have reduced engine life. It is therefore desirable, particularly in turboshaft and turboprop engines where there are such significant changes in output with changes in temperature, to keep the variation between indicated and actual temperatures as small as possible. One way to increase the accuracy is to increase the number of thermocouples, thereby reducing the circumferential spacing therebetween. While this approach gives a better indication of the circumferential average temperature, it does not increase the measuring accuracy with respect to the radial average temperature. Furthermore, this approach has limitations in that the additional thermocouples, especially in turboshaft and turboprop engines where the thermocouples are typically located between the gas generator and power turbines, increase the blockage in the fluid flow passageway and therefore increase substantially the pressure drop occurring between the gas generator and power turbines.

It is therefore a primary object of this invention to provide improved temperature measuring means for indicating accurately the average temperature existing in a gas turbine engine.

Another object of this invention is to provide improved temperature measuring means for measuring accurately the average temperature of a stream of combustion gases.

Another object is to provide temperature measuring apparatus for indicating accurately the actual temperature existing in a gas turbine engine without increasing the pressure drop between the gas generator and power turbines.

Briefly stated, in accordance with an illustrated embodiment of the invention, a plurality of thermocouples are mounted within the hollow interiors of circumferentially spaced power turbine stator vanes. In this manner, any desired number of thermocouples can be used without increasing the blockage and the pressure drop in the annular flow passageway. More particularly, each of the vanes in which the thermocouples are mounted has at least two radially spaced openings in its leading edge and at least one opening adjacent its trailing edge, the openings communicating with the vane's hollow interior. Baffles within each of the vanes divide the vane's hollow interior into a tortuous passageway including a mixing chamber of substantial radial extent adjacent the leading edge. Each thermocouple is mounted on a radial probe which is inserted through radially aligned openings in the turbine casing and the outer end wall of the respective vane. With the probe properly inserted, the thermocouple is positioned intermediate the mixing chamber and the opening in the trailing edge of the vane in a location in which the baffles concentrate the fluid flowing through the tortuous passageway on the thermocouple. The temperature measuring assembly is completed by means electrically connecting the thermocouples such that the average electromotive force produced can be measured and by sealing means to prevent leakage of motive fluid through the openings in the outer end walls of the vanes and in the turbine casing.

While the novel features of this invention are set forth with particularity in the appended claims, the invention, both as to organization and content, will be better understood and appreciated, along with other objects and features thereof, from the following description taken in conjunction with the drawing, in which:

FIG. 1 is a view partially in section of a portion of a gas turbine engine having a power turbine and the temperature sensing apparatus of this invention;

FIG. 2 is a pictorial view of one of the stator vanes and its associated thermocouple;

FIG. 3 is a detailed view of one of the thermocouple probes;

FIG. 4 is a view showing the sealing arrangement of the present invention; and

FIG. 5 is a pictorial view of the power turbine portion of the engine of FIG. 1 taken along viewing line 5—5.

Referring first to FIG. 1, a portion of a gas turbine engine 10 is illustrated. The engine 10 is of the conventional turboprop or turboshaft type and has a cylindrical casing 11 enclosing an annular fluid flow passageway which extends axially through the engine, the passageway being indicated generally by the numeral 12. The annular passageway 12 includes an annular combustion space 13 defined between the casing 11 and an inner wall 14, the actual combustion occurring within a combustion liner 15 located within the combustion space 13. The combustion products are supplied at high temperature to an annular nozzle diaphragm 16 which in turn directs the hot gases to a row of turbine buckets 17 at the proper velocity and at the proper angle. The turbine buckets 17 are peripherally mounted on a turbine wheel 20 which, along with its associated shaft 21 and a second turbine wheel 22 having buckets 23 mounted thereon, is rotatably mounted within the engine 10 by suitable mounting means not illustrated. A second annular nozzle diaphragm 24 receives the hot gases exhausted from the first stage turbine buckets 17 and redirects the gases to the second stage turbine buckets 23. The turbine unit comprising the wheels 20 and 22 and the shaft 21 drives the compressor (not shown) of the engine 10 and is conventionally known as a "gas generator turbine."

The particular engine illustrated by FIG. 1 has a "power turbine" downstream of the gas genereator turbine, the power turbine comprising second set of turbine wheels 25 and 26 secured to a second shaft 27 which is connected to a load (not shown). Peripheral rows of buckets 28 and 29 are mounted on the wheels 25 and 26. The combustion products exhausted from the gas generator turbine are supplied to the buckets 28 and 29 at the proper velocity and the proper angle by third and fourth annular nozzle diaphragms 30 and 31, respectively. An engine, such as the one illustrated, having a power turbine is conventionally referred to as being a "turboprop engine" when the power turbine drives a propeller and as a "turboshaft engine," when the power turbine drives some other load through its shaft 27.

To produce maximum power output, the hot combustion gases are supplied to the nozzle diaphragm 16 at the highest allowable temperature, this maximum temperature usually being limited by the high temperature capabilities of the airfoil shaped vanes comprising the nozzle diaphragm 16 and the turbine buckets 17. Conventional thermocouples used by prior art arrangements and by the temperature measuring apparatus of the present invention are unable, from a practical standpoint, to reliably withstand the high temperatures at which the nozzle diaphragm 16 and the turbine buckets 17 operate on high performance engines. It is therefore common to measure the temperature existing in a lower temperature portion of the engine and to then use the measured temperature as an indication of the actual temperature in the higher temperature portion of the engine. This general approach is used by the apparatus of the present invention in that the temperature of the gases entering the power turbine nozzle diaphragm 30 is measured and used as an indication of the gas generator turbine inlet temperatures. The present apparatus differs substantially from the prior art arrangement, however, in that its structural arrangement makes possible extremely accurate measurement of the average gas temperature at the nozzle diaphragm 30, thereby indicating with far greater accuracy the gas generator turbine inlet temperatures.

With reference being directed to FIGS. 1, 2, and 5, the power turbine nozzle diaphragm 30 is comprised of a plurality of circumferentially spaced, radially extending vanes 40, one of the airfoil shaped vanes 40 being illustrated in detail by FIG. 2. The vane 40 has a hollow interior formed by radially spaced inner and outer end walls 41 and 42, respectively, and convex and concave side walls 43 and 44, respectively, connecting axially spaced upstream leading and downstream trailing edge portions 45 and 46, respectively. A number of radially spaced openings 47 are provided in the leading edge 45 and a number of radially spaced openings 48 are provided adjacent the trailing edge 46, the openings 48 preferably being located in the convex wall 43. The openings 47 are thus located in the highest pressure region while the openings 48 are located in the lowest pressure region. A radially extending transverse wall 49 divides the hollow interior of the vane 40 into a first chamber 50 adjacent the leading edge 45 and a second chamber 51 adjacent the trailing edge 46. The transverse wall 49 extends inwardly from the outer end wall 42 to a point just short of the inner end wall 41 such that an opening 52 thus formed adjacent the inner end wall 41 is the only passage connecting the radially extending first and second chambers 50 and 51. A baffle 53 is located within the second chamber 51 and forms with the transverse wall 49 and the side walls a small area passage 54 within which a thermocouple 55 is located.

Before proceeding with a description of the thermocouple 55 and its mounting arrangement, it should be noted that the structure just described forms a tortous passageway interconnecting the radially spaced openings 47 in the leading edge 45 and the openings 48 adjacent the trailing edge 46. Because of the substantial pressure difference between the leading and trailing edges, some of the gases impinging on the leading edge 45 enter the first chamber 50 through the spaced openings 47 and are mixed therein, after which the gases flow through the opening 52 into the second chamber 51 where the baffle 53 directs the entire stream of mixed fluid through the small area passage 54 formed between the baffle 53 and the transverse wall 49. Because of the mixing which occurs in the first or mixing chamber 50 and which continues to occur as the fluid flows through the opening 52 and the passage 54, the thermocouple 55 is exposed to gases having a temperature which is substantially the radial average temperature of the gases impinging on the vane's leading edge 45. Also, because of the pressure difference between the leading and trailing edges, the flow rate through the tortuous passageway is sufficient to assure relatively rapid response to temperature changes. It will be appreciated, of course, that the flow rate can be controlled either by varying the number and size of the opening 48 or by varying the location of the openings 48. For example, the pressure drop and flow rate will be greater when the openings 48 are located in the convex wall 43, the low pressure side of the vane 40, than when the same number of similarly sized openings are located in the concave wall 44.

The thermocouple 55 produces an EMF or electromotive force which, when compared with an EMF produced by a reference junction at a known temperature, is related in a known manner to the temperature of the thermocouple or the radial average temperature of the gases impinging on the vane's leading edge 45. In the practice of the present invention, all or a selected number of the vanes comprising the nozzle diaphragm 30 are provided with tortuous passageways and thermocouples as described above, each of the thermocouples producing an EMF related to the radial average temperature at a different circumferential point in the nozzle diaphragm. These thermocouples are electrically interconnected in parallel as illustrated by the wiring harness 58 of FIG. 5 such that a circumferential average EMF is produced. This EMF is thus indicative of a temperature which represents both a circumferential and radial average. The precise manner in which the thermocouples are electrically connected is not illustrated. For a more detailed description of a suitable manner of connecting the thermocouples in parallel, attention is directed to United States Patent 2,996,916 to R. J. Smith, issued Aug. 22, 1961, and assigned to the assignee of this invention. While all of the vanes comprising the nozzle diaphragm 30 may be thus provided with tortuous passageways and thermocouples, it has been found in practice that such a large number is not generally required for acceptable accuracy. For example, it has been found in one application where the nozzle diaphragm had 56 vanes that 14 thermocouples located in every fourth vane gave suitable accuracy. It will be obvious, however, that any desired number of thermocouples can be used without increasing the blockage in the annular flow passageway and thereby increasing the pressure drop across the nozzle diaphragm.

The mounting means for the thermocouples will now be described. As best shown by FIGS. 3 and 4, each thermocouple 55 is mounted at the radially inner end of a probe 60, the crossed wires 61 and 62 actually forming the thermocouple junction extending outwardly through substantially rigid insulating sheaths 61a and 62a to the outside of the engine casing 11 where the wires 61 and 62 from the various thermocouples can be electrically interconnected as shown by FIG. 5. Alternatively, a single insulating sheath containing both wires 61 and 62 could be used. The insulating sheaths 61a and 62a extend through an intermediate member 63 comprising a disc 64 having an accurately machined lower surface 64a and a generally cylindrical lug 65 depending from the disc 64, the lug 65 as shown having two diametrically opposed flattened portions 65a. As shown by FIGS. 2 and 4, the outer end wall 42 of the vane 40 has a boss 70 mounted thereon, the boss 70 having a generally cylindrical opening 71 therein having flattened portions 71a. The outer surface 72 of the boss 70 is accurately machined. The engine casing 11 has an opening 73 therein radially aligned with the opening 71 such that the thermocouple 55 can be inserted radially through the openings 73 and 71 until the lug 65 enters the opening 71 and the lower surface 64a of the disc 64 engages the outer surface 72 of the boss 70. The distance between the junction of the wires 61 and 62 and the lower surface 64a of the disc is such that the thermocouple 55 is located as specified above where the fluid flow within the second chamber 51 is concentrated by the baffle 53 and the transverse wall 49 into the small area passage 54. The flattened portions 65a and 71a of the lug 65 and the opening 71 mate to assure that the thermocouple 55 is positioned as desired in the passage 54.

The outer surface of the disc 64 has a spherical-shaped margin 75 which mates with a similarly shaped inner surface on a ring 76. The ring 76 has an accurately machined outer surface which is contacted by a similarly shaped inner surface on a piston 77 which is slidably received in the opening 73 in the engine casing, the space between the piston 77 and the opening 73 being sealed by an O-ring 78 or other suitable means if necessary to control leakage. The piston 77, the ring 76, and the disc 64, and therefore the entire probe 60, are forced inwardly by a spring 79 held at its outer end by a cap 80 screwed onto the engine casing 11 at 81. The insulating sheaths 61a and 62a extend through an opening 82 in the cap 80. The cap 80 and the spring 79 thus maintain the entire assembly including the thermocouple 55, in position and also prevent leakage. The gases within the second chamber 51 cannot escape outwardly through the opening 71 because of the seal between the accurately machined surfaces 64a and 72. Similarly, any gases in the region 83 outwardly of the shroud 84 supporting the outer ends of the vanes 40 cannot escape through the seals formed between the spherical-shaped margin 75 of the disc 64 and the ring 76, between the ring 76 and the piston 77, and between the piston 77 and the opening 73 in the engine casing 11. Also, the spherical sealing surfaces provided on the disc 64 and the ring 76 permits adequate sealing even though the various elements may be slightly misaligned during actual use. In addition to preventing leakage, the spring 79 allows differential thermal expansion between the shroud 84 and the engine casing 11. It should be noted that the thermocouple 55 is located a sufficient distance from the outer end wall 42 to minimize the thermal conduction error.

From the foregoing, it will be seen that the present invention provides improved means for indicating accurately the average temperature existing in a gas turbine engine without increasing the pressure drop between the gas generator and power turbines.

While a preferred embodiment of the invention has been illustrated and described above, it will be obvious to those having skill in the art that other arrangements could be used. For example, the transverse wall 49 and the baffle 53 could be replaced by a cylindrical tube within which the thermocouple could be located. The tube would divide the vane interior into the first and second regions, and suitably placed openings in the tube would complete the tortuous passageway between the openings 47 and 48. Other arrangements would also be obvious. Therefore, it is understood that various changes and modifications may be made without departing from the spirit and scope of the invention, and it is intended to cover all such changes and modifications by the appended claims.

What is claimed as new and is desired to secure by Letters Patent of the United States is:

1. Gas temperature measuring apparatus for measuring the temperature of gases in the annular fluid flow passageway of a gas turbine engine, said gas temperature measuring apparatus comprising in combination:
  (a) a cylindrical casing enclosing the annular fluid flow passageway,
  (b) a plurality of circumferentially spaced, radially extending vanes traversing the annular passageway,
  (c) a plurality of openings in said casing each radially outward of a respective one of said vanes,
  (d) each of said vanes having a hollow interior formed by radially spaced inner and outer end walls and side walls connecting axially spaced upstream leading and downstream trailing edge portions,
  (e) each vane having a plurality of radially spaced openings in the leading edge and at least one opening adjacent the trailing edge,
  (f) a radially extending transverse wall dividing the interior of each vane into a radially extending mixing chamber adjacent the leading edge and a second chamber adjacent the trailing edge,
  (g) a passage adjacent one end of the vane providing fluid flow communication between the mixing and second chambers,
  (h) the outer end wall of each vane having an opening therein downstream of the transverse wall each of said openings being radially aligned with a respective one of the openings in the casing,
  (i) a plurality of probes each extending radially inward through an associated set of openings in said casing and in an outer end wall of one of said vanes into the second chamber of the respective vane,
  (j) a plurality of thermocouples each supported by a respective one of said probes within the second chamber of the respective vane,
  (k) sealing means between each of said probes and the opening in the outer end wall of the respective vane,
  (l) and means electrically connecting the plurality of thermocouples in parallel such that the average electromotive force produced can be determined.

2. Gas temperature measuring apparatus for measuring the temperature of gases in the annular fluid flow passageway of a gas turbine engine, said gas temperature measuring apparatus comprising in combination:
  (a) a cylindrical casing enclosing the annular fluid flow passageway,
  (b) a plurality of circumferentially spaced, radially extending vanes traversing the annular passageway,
  (c) a plurality of openings in said casing each radially outward of a respective one of said vanes, (d) each of said vanes having a hollow interior formed by radially spaced inner and outer end walls and side walls connecting axially spaced upstream leading and downstream trailing edge portions,
(e) each vane having a plurality of radially spaced openings in the leading edge and at least one opening adjacent the trailing edge,
(f) a radially extending transverse wall dividing the interior of each vane into a radially extending mixing chamber adjacent the leading edge and a second chamber adjacent the trailing edge,
(g) a passage adjacent one end of the vane providing fluid flow communication between the mixing and second chambers,
(h) the outer end wall of each vane having an opening therein downstream of the transverse wall, each of said openings being radially aligned with a respective one of the openings in the casing,
(i) a sealing surface surrounding the opening in the outer end wall of each vane,
(j) a plurality of probes each extending radially inward through an associated set of openings in said casing and in an outer end wall of one of said vanes into the second chamber of the respective vane,
(k) each probe including a seal shoulder formed integrally therewith,
(l) means urging each seal shoulder into sealing contact with the sealing surface of the respective vane,
(m) a plurality of thermocouples each supported by a respective one of said probes within the second chamber of the respective vane,
(n) and means electrically connecting the plurality of thermocouples in parallel such that the average electromotive force produced can be determined.

3. Gas temperature measuring apparatus as defined by claim 2 including additional baffle means within each vane for concentrating fluid flow within the second chamber on the thermocouple supported therein.

4. Gas temperature measuring apparatus as defined by claim 3 in which the means urging each seal shoulder into contact with the respective sealing surface includes a spring and intermediate members having spherical surfaces to accommodate misalignment.

5. Gas temperature measuring apparatus for measuring the temperature of gases in the annular fluid flow passageway of a gas turbine engine, said gas temperature measuring apparatus comprising:
(a) a plurality of circumferentially spaced, radially extending vanes traversing the annular passageway,
(b) each of said vanes having a hollow interior formed by radially spaced inner and outer end walls and side walls connecting axially spaced upstream leading and downstream trailing edge portions,
(c) each vane having at least two radially spaced openings in the leading edge and at least one opening adjacent the trailing edge,
(d) baffle means within each vane comprising a radially extending transverse wall dividing the interior of the vane into a mixing chamber adjacent the leading edge and a second chamber adjacent the trailing edge, a passage adjacent one end of the vane providing fluid flow communication between said chambers such that a tortuous fluid flow passageway is formed interconnecting the radially spaced openings in the leading edge and the opening adjacent the trailing edge,
(e) an opening in the outer end wall of each vane,
(f) a plurality of probes each extending radially inward through an opening in the outer end wall of one of said vanes into the hollow interior of the vane,
(g) sealing means between each of said probes and the opening in the outer end wall of the respective vane to prevent leakage therebetween,
(h) a plurality of thermocouples each supported by a respective one of said probes within the tortuous passageway of the respective vane intermediate the mixing chamber and the opening adjacent the trailing edge,
(i) and means electrically connecting said plurality of thermocouples in parallel such that the average electromotive force produced can be determined.

References Cited

UNITED STATES PATENTS

| | | | |
|---|---|---|---|
| 2,875,613 | 3/1959 | Neal | 73—341 |
| 2,911,831 | 11/1959 | Davies | 73—343 |
| 2,942,472 | 6/1960 | Harney | 73—349 |
| 2,971,997 | 2/1961 | Carrico | 136—4 |
| 3,216,258 | 11/1965 | Spencer et al. | 73—349 |

FOREIGN PATENTS

| | | |
|---|---|---|
| 734,702 | 8/1955 | Great Britain. |

LOUIS R. PRINCE, *Primary Examiner.*

D. McGIEHAN, D. M. YASICH, *Assistant Examiners.*